United States Patent [19]

Nagaoka

[11] Patent Number: 5,476,588

[45] Date of Patent: Dec. 19, 1995

[54] MULTI-LAYER COMPOSITE SCREEN

[75] Inventor: Tadayoshi Nagaoka, Mihara, Japan

[73] Assignee: Nagaoka International Corporation, Osaka, Japan

[21] Appl. No.: 384,606

[22] Filed: Feb. 3, 1995

Related U.S. Application Data

[63] Continuation of Ser. No. 175,272, Dec. 29, 1993, abandoned.

[30] Foreign Application Priority Data

Jan. 18, 1993 [JP] Japan .................................. 5-023309

[51] Int. Cl.⁶ .................................................... B01D 29/56
[52] U.S. Cl. .......................... 210/499; 29/163.8; 29/902
[58] Field of Search ............................. 29/163.6, 163.8, 29/902; 210/498, 499

[56] References Cited

U.S. PATENT DOCUMENTS

| | | | |
|---|---|---|---|
| 3,941,703 | 3/1976 | Binard | 210/499 |
| 4,634,525 | 1/1987 | Yant | 210/499 |
| 4,655,922 | 4/1987 | Arai | 210/497.1 |
| 4,818,403 | 4/1989 | Nagaoka | 29/902 |
| 5,047,148 | 9/1991 | Arai | 29/163.8 |

FOREIGN PATENT DOCUMENTS 2380807  9/1978  France .

*Primary Examiner*—Robert A. Dawson
*Assistant Examiner*—W. L. Walker
*Attorney, Agent, or Firm*—Hedman, Gibson & Costigan

[57] ABSTRACT

A multi-layer composite screen having filters of a plurality of layers superposed one upon another is provided. Each filter of the plurality of layers has wires of a substantially triangular or trapezoidal cross section arranged in parallel to one another with a continuous slit of a substantially V-shaped cross section being formed between respective adjacent wires, said slit widening increasingly inwardly from the surface of the screen. The wires of one filter of the respective adjacent filters cross the wires of the other filter and the respective adjacent filters are fixed to each other at crossing points of the wires of the respective filters. In one aspect of the invention, the wires are formed with linear projections extending in the longitudinal direction of the wires which facilitate electrical welding of the filters of the adjacent layers.

3 Claims, 4 Drawing Sheets

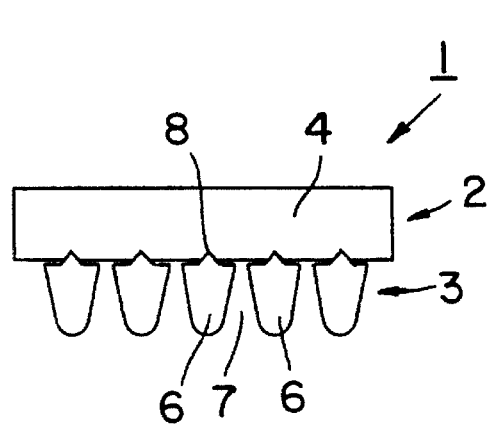
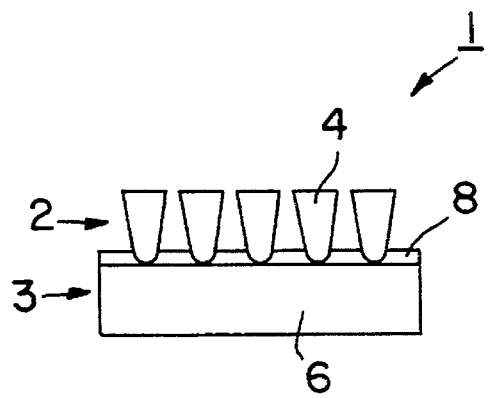
FIG. 2A  FIG. 2B
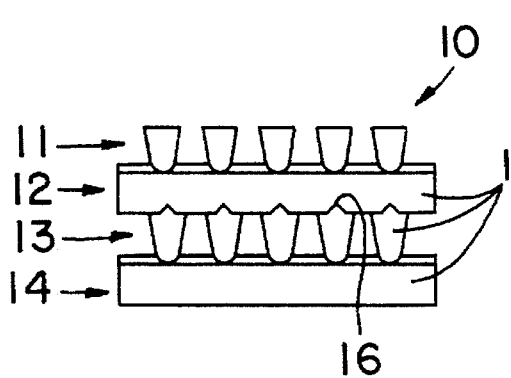
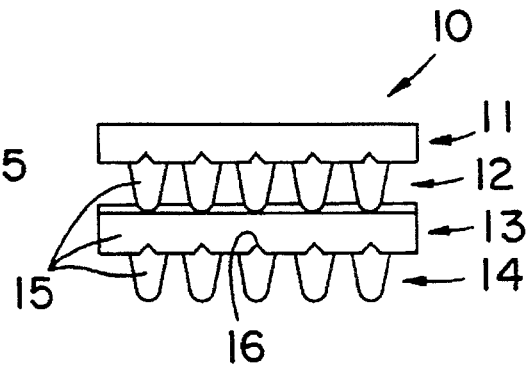
FIG. 3A  FIG. 3B ns.
MULTI-LAYER COMPOSITE SCREEN This application is a continuation of Ser. No. 08/175,272, filed Dec. 29, 1993, which is now abandoned.

BACKGROUND OF THE INVENTION

This invention relates to a screen suitable for use as a precision filtering screen in various fields of industry.

Known in the art are wedge wire screens which are utilized in a broad range of industrial fields as a rugged screen which have little likelihood of clogging owing to their wires with a flat surface and a V-shaped continuous slit. These wedge wire screens are recognized as filters which are technically superior to conventional filters made of mesh-wires and punched plates.

There is however a case where a wedge wire screen of a single layer cannot perform a sufficient filtering function in some fields of industry where a precision filtering is required. In this case, it has been conventionally practiced to superpose two wedge wire screens one upon the other to cope with such precision filtering requirement.

As shown in FIG. 4A, the conventional wedge wire screen 1 is composed of a plurality of wedge wires 2 and a plurality of support rods 3, which support rods 3 are arranged with a proper interval in such a manner that they cross the wedge wires 2 and projecting portions 2b of the wedge wires 2 on the opposite side of a screen surface 2a are electrically welded to projecting portions 3a of the support rods 3. In the above described case where a single layer of such wedge wire screen 1 is not sufficient for performing a required precision filtering function, two layers of the wedge wire screens 1 are superposed one upon the other as shown in FIG. 4B to cope with such situation.

In the prior art method according to which two layers of the wedge wire screens 1 are superposed one upon the other, however, the thickness of the entire filter becomes double that of the wedge wire screen 1 of a single layer and this causes inconvenience in a case where the filtering device is limited in its structure due to spatial limitation.

Even in a case where there is no such spatial limitation, it requires a laborious work to superpose one filter upon another while taking care to secure required slits in the respective filters. Besides, such superposed filters require a frame to support the filters and an extra work to weld the filters of two layers to such frame.

Thus, the manufacturing cost of such wedge wire screens composed in two layers will become more than double that of a wedge wire screen of a single layer.

It is, therefore, an object of the present invention to overcomne the problem arising in adopting the prior art multi-layer screen in the field precision filtering and provide a multi-layer composite screen which enables to reduce total thickness of the screen and facilitates manufacturing and reduces the manufacturing cost.

SUMMARY OF THE INVENTION

A multi-layer composite screen achieving the above described object of the invention comprises filters of a plurality of layers superposed one upon another, each filter of said plurality of layers comprising wires of a substantially triangular or trapezoidal cross section arranged in parallel to one another with a continuous slit of a substantially V-shaped cross section widening increasingly inwardly from the surface of the screen being formed between respective adjacent wires, the wires of one filter of the respective adjacent filters crossing the wires of the other filter and the respective adjacent filters are fixed to each other at crossing points of the wires of the respective filters.

According to the invetion, the wires of each layer cross and fixed to the wires of the adjacent upper layer and thereby function as support rods for the wires of the upper layer and hence support rods in each layer which have been indispensable in the conventional wedge wire screens are omitted. Accordingly, the total thickness of the screen as a whole becomes about half that of the conventional multi-layer screen made by superposing wedge wire screens in plural layers. In manufacturing the screen, the multi-layer composite screen of the invention can be made by simply fixing wires of the respective layer at their crossing points and no extra component parts such as a frame is required.

Since the wires of the respective layers are so arranged that the V-shaped continuous slits of the wires widen increasingly inwardly from the surface of the screen, the wires of the respective layers have a complete filtering function and have the advantage that little clogging of the slits takes place and occasional reverse washing is easy.

In one aspect of the invention, in the multi-layer composite screen, wires of the filters of the second and subsequent layers comprise linear projections formed on the surface of the wire constituting the screen surface and extending in the longitudinal direction of the wires and the respective adjacent filters are fixed to each other by electrical welding.

According to this aspect of the invention, electrical welding can be carried out between the projections of the wires of the first layer opposite to the screen surface and the linear projections of the wires of the second layer whereby the filters of the adjacent two layers can be rigidly fixed to each other.

In another aspect of the invention, in the multi-layer composite screen, wires of respective layers other than the lowermost layer have a flat surface on the side opposite to the screen surface and respective adjacent filters are fixed to each other by means of a bonding agent applied to their crossing portions.

According to this aspect of the invention, the wires of the two adjacent layers can be fixed to each other by applying a bonding agent at crossing portions of the flat surface of the wires of the first layer and the flat screen surface of the wires of the second layer.

Embodiments of the invention will now be described with reference to the accompanying drawings.

BRIEF DESCRIPTION OF THE DRAWINGS

In the accompanying drawings.

FIG. 2A is a front view of the embodiment;

FIG. 2B is a side elevational view of the embodiment;

FIG. 3A is a front view of another embodiment of the invention;

FIG. 3B is a side elevational view of this embodiment;

DESCRIPTION OF PREFERRED EMBODIMENTS

Figure 1:
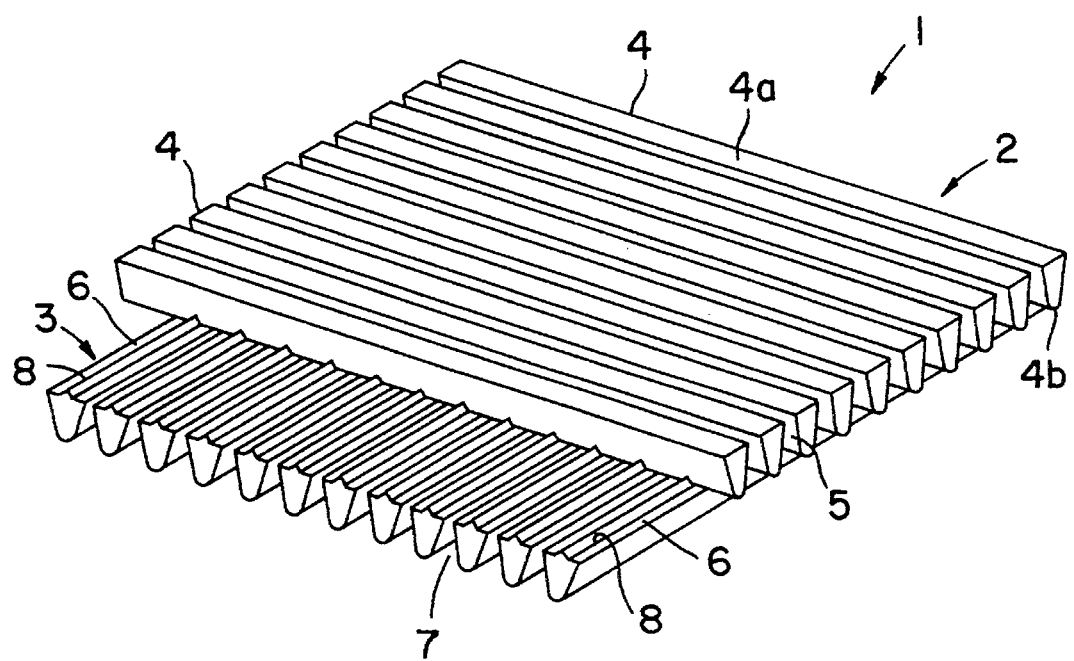
FIG. 1 is a perspective view showing an embodiment of a multi-layer composite screen according to the invention.
Figure 4A:
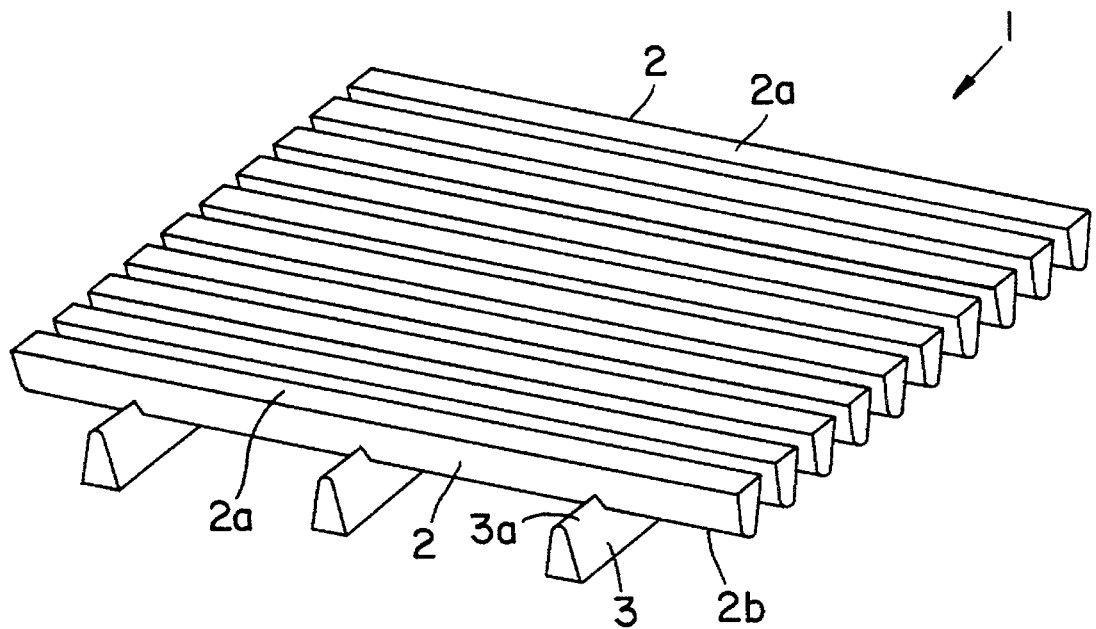
FIG. 4A is a perspective view showing a conventional wedge wire screen.
Figure 4B:
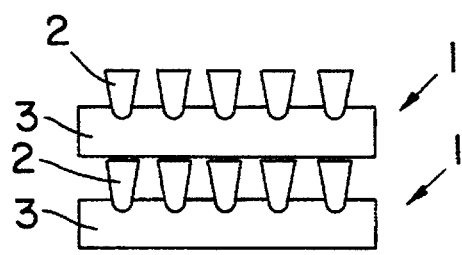
FIG. 4B is a side elevational view showing a composite screen made by superposing two conventional wedge wire screens one upon the other.

Referring now to FIGS. 1 and 2, a preferred embodiment of the invention will be described.

The composite screen of this embodiment is a flat composite screen 1 of two layers consisting of a filter 2 of the first layer and a filter 3 of the second layer. The filter 2 of the first layer consists of wedge wires 4 arranged in parallel to one another forming continuous slits 5 of a substantially V-shaped cross section between respective adjacent wedge wires 4. Surfaces 4a of the wedge wires 4 constituting the screen surface are formed in flat surfaces.

The filter 3 of the second layer consists of wedge wires 6 arranged in parallel to one another forming continuos slits 7 of a V-shaped cross section between respective adjacent wires in the same manner as the filter 2 of the first layer. The wedge wires 6 are formed on their surfaces on the side of the screen surface with linear projections 8 which extend in the longitudinal direction of the wires 6. The V-shaped slits 5 and 7 are formed in such a manner that the slits 5 and 7 widen increasingly internally from the screen surface 4a.

The wires 4 of the filter 2 of the first layer cross the wires 6 of the filter 3 of the second layer and projecting portions 4b of the wedge wires 4 of the filter 2 on the opposite side of the screen surface 4a and the linear projections 8 of the wedge wires 6 of the filter 3 are welded by electrical welding to each other at their crossing points and thereby the filter 2 of the first layer and the filter 3 of the second layer are connected rigidly to each other.

Since the continuous slits 5 of the filter 2 of the first layer cross the continuous slits 7 of the second filter 3 of the second layer, fluid to be treated are subject to double filtering operations so that a desired precision filtering is achieved.

In this embodiment, if the continuous slits 5 of the filter 2 of the first layer are formed relatively coarsely and the continuous slits 7 of the filter 3 of the second layer are formed relatively finely, a function of a double filter consisting of a primary coarse sieve and a secondary fine sieve will be achieved with a thickness which is substantially equal to the thickness of a normal wedge wire screen of a single layer. If the width of the filter 2 of the first layer is made the same as the width of the filter 3 of the second layer, a double filter whcih can perform an accurate filtering effect will be obtained.

The filter 2 of the first layer has a function of protecting the filter 3 of the second layer. More specifically, when an object to be treated collides with the first filter 2 with a vehement force, the impact will not be transmitted to the second filter 3 of the second layer. Even in the event that the filter 2 of the first layer is damaged, the filtering function will stll be maintained somehow by the filter 3 of the second layer.

Since the continuous slits 5 of the filter 2 cross the continuous slits 7 of the filter 3, an elongated and flat foreign matter in the object to be treated which may have passed through the continuous slit 5 of the filter 2 can be caught by the filter 3.

The wedge wires 6 having the linear projections 8 which constitute the filter 3 of the second layer can be manufactured by the method disclosed, for example, in the European Patent Application Publication No. 0 533 349 A1.

Acoording to the invention, not only the composite screen made of the two filters 2 and 3, but a multi-layer composite screen composed of three or more layers can be provided by repeating the same process with about half the thickness that of a screen made by superposing wedge wire screens of the same number of layers. FIGS. 3A and 3B schematically show a composite screen made of filters of four layers.

In the embodiment of FIGS. 3A and 3B, a screen 10 is made by arranging a filter 11 of the first layer, a filter 12 of the second layer, a filter 13 of the third layer and a filter 14 of the fourth layer in such a manner that wedge wires of each filter cross wedge wires of each adjacent filter. The wedge wires 15 of the respective filters 12, 13 and 14 of the second, third and fourth layers are formed, like the wedge wires 6 in the above described embodiment, with linear projections 16 on the surface on the screen surface side and are electrically welded to the adjacent wedge wires 15. Since the structure and manner of assembling of the filters 11, 12, 13 and 14 are the same as those of the filters 2 and 3 in the above described embodiment, detailed description thereof will be omitted.

In the above described embodiments, the filters of the adjacent two layers are connected to each other by electrically welding at their crossing points and, therefore, the connection is rigid and the composite screen can stand bending and folding. The invention however is not limited to these embodiments in which flat screens are provided but can be applied to manufacturing of multi-layer composite screens of various shapes.

Figure 5A:
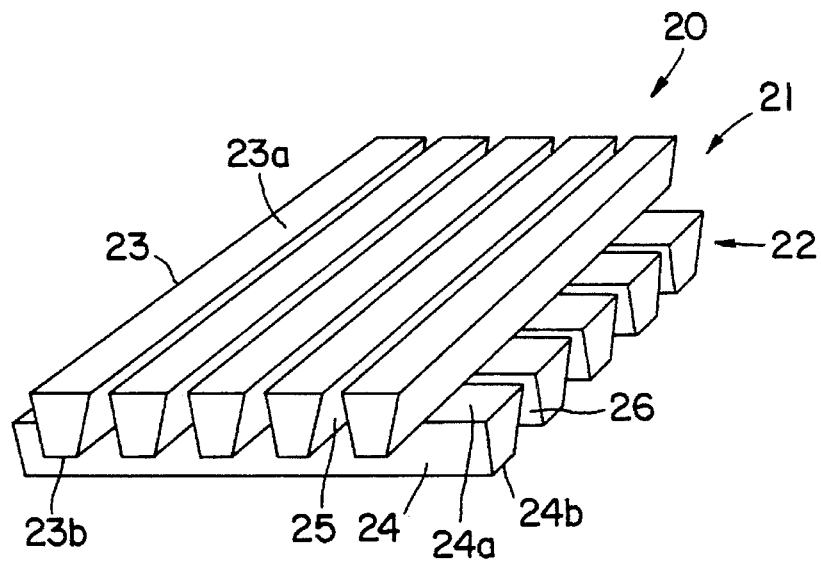
FIG. 5A is a perspective view showing another embodiment of the invention.
Figure 5B:
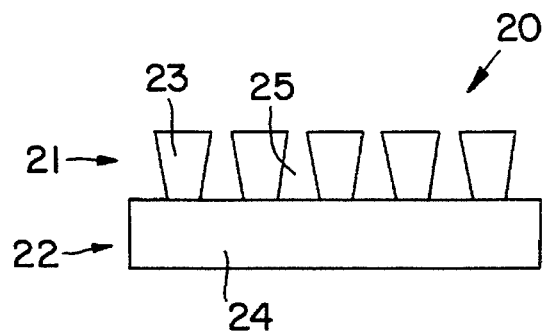
FIG. 5B is a front view of this embodiment.
Figure 5C:
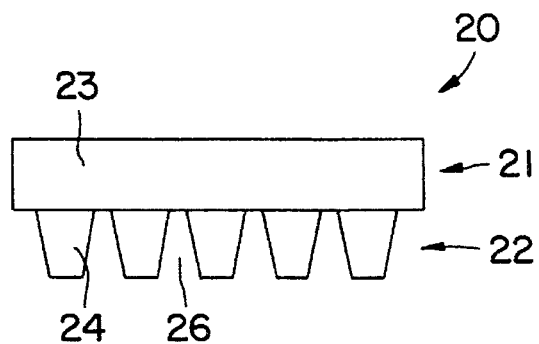
FIG. 5C is a side elevational view of this embodiment.

FIGS. 5A, 5B and 5C show another embodiment of the invention. In this embodiment, a screen 20 is made of a filter 21 of the first layer and a filter 22 of the second layer crossing each other. Wires 23 and 24 of the respective layers have a trapezoidal cross section and are arranged in parallel to one another thereby forming continuous slits 25 and 26 of a V-shaped cross section widening increasingly internally from the screen surface.

The respective wires 23 and 24 have flat surfaces 23a and 24a on their screen surface side and have also flat smooth surfaces 23b and 24b on the side opposite to the screen surface side.

In this embodiment, wires of the same cross section are used as the wires 23 and 24. The wires of the lowest layer (i.e., the wires 24 in this embodiment) need not be formed in a flat surface on the side opposite to the screen surface side but may be formed in a desired shape.

The adjacent filters 21 and 22 of the first and second layers are connected to each other by means of a suitable known bonding agent applied to portions where the flat surfaces 23b of the wires 23 of the filter 21 cross the flat surface 24a of the wires 24 of the filter 22.

This embodiment shows a composite screen made of the filters of the two layers. It will be apparent that a composite filter of three or more layers can be made if necessary.

What is claimed is:

1. A multi-layer composite screen comprising filters of a plurality of layers superposed one upon another, each filter of said plurality of layers comprising wires of a substantially triangular or trapezoidal cross section arranged in parallel to one another with a continuous slit of a substantially V-shaped cross section widening increasingly inwardly from the surface of the screen being formed between respective adjacent wires, the wires of one filter of the respective adjacent filters crossing the wires of the other filter and the respective adjacent filters are fixed to each other at crossing points of the wires of the respective filters.

2. A multi-layer composite screen as defined in claim 1 wherein wires of the filters of the second and subsequent layers comprise linear projections formed on the surface of the wire constituting the screen surface and extending in the longitudinal direction of the wires and the respective adjacent filters are fixed to each other by electrical welding.

3. A multi-layer composite screen as defined in claim 1 wherein wires of respective layers other than the lowermost layer have a flat surface on the side opposite to the screen surface and respective adjacent filters are fixed to each other by means of a bonding agent applied to their crossing portions.

* * * * *